United States Patent [19]
Dworak et al.

[11] Patent Number: 5,988,222
[45] Date of Patent: Nov. 23, 1999

[54] PULSATION DAMPER

[75] Inventors: Wilhelm Dworak; Hans Aichele, both of Stuttgart; Wolfgang Steudel, Bietigheim-Bissingen; Georg-Alois-Hermann Winkes, Hemmingen; Bernhard Sacha, Besigheim; Guido Bredenfeld; Olaf Klemd, both of Markgroeningen; Werner Steprath, Dormagen, all of Germany

[73] Assignee: Robert Bosch GmbH, Stuttgart, Germany

[21] Appl. No.: 08/953,968

[22] Filed: Oct. 20, 1997

[30] Foreign Application Priority Data

Oct. 21, 1996 [DE] Germany .............. 196 43 327

[51] Int. Cl.$^6$ .................................... F16L 55/04
[52] U.S. Cl. .............................. 138/30; 138/26

[58] Field of Search .................... 138/26, 30, 31

[56] References Cited

U.S. PATENT DOCUMENTS

| 4,014,213 | 3/1977 | Parquet | 138/30 X |
| 4,177,836 | 12/1979 | Thompson | 138/30 |

Primary Examiner—Patrick Brinson
Attorney, Agent, or Firm—Michael J. Striker

[57] ABSTRACT

A pulsation damper for hydraulic circuits has a housing including a bottom, a casing, and a cover, a damper chamber which is sealed from outside and provided with supply and discharge means for a pressure medium, the housing being composed of two parts so that the bottom and the cover are connected with one another to form a single central element, while the casing peripherally surrounds the central element, the central element, and means forming force-free connecting points between the central element and the cover.

6 Claims, 2 Drawing Sheets

PULSATION DAMPER

BACKGROUND OF THE INVENTION

The present invention relates to a pulsation dampers, in particular in hydraulic circuits.

Pulsation dampers in hydraulics circuits are used for reducing pressure or volume stream pulsations, which are caused by displacement pumps because of their working principle. The pulsation dampers which for this purpose are located immediately after the pressure outlet of the displacement pumps are either directly integrated in the pump housing or as separate components are mounted on the pumps or arranged externally to them. For a price-favorable manufacture in a diecasting processes, the damper chambers of conventional pulsation dampers need large openings which are closed by corresponding covers. These covers must be secured by heavy and expensive mounting elements because of their pressure-loaded surfaces.

A separate pulsation damper which is directly mounted on a radial piston pump in an eccentric construction is disclosed in FIG. 1 of the German patent document DE 37 12 412 A1. This pulsation damper is composed of a one-part housing which is connected in a not shown manner by its flange surface with the housing of the radial piston pump. The flange surface of the pulsation damper provides an undercut which makes the manufacturing cost of the housing more expensive. The pressure forces of the feed stream of the radial piston pump which pulsates in the damper chamber loads the housing, because of the one-piece construction, substantially with a pulsating pulling stress in axial and tangential directions of the pulsation damper. In order to provide the required strength of the housing relatively thick walls must be utilized, or a limitation to the pressure-loading surfaces and thereby the damping properties of the pulsation damper is needed.

SUMMARY OF THE INVENTION

Accordingly, it is an object of the present invention to provide a pulsation damper which avoids the disadvantages of the prior art.

In keeping with these objects and with others which will become apparent hereinafter, one feature of present invention resides, briefly stated in a pulsation damper, in which the housing is composed of two parts, the bottom and the cover are assembled with one another to form an individual central element which is peripherally surrounded by a separate casing, and force-free connecting points are formed between the central element and the casing.

The vibration damper in accordance with the present invention eliminates the disadvantages of the prior art and provides for the highly advantageous results, since the housing is composed of two parts, namely the central element and the casing. With this construction, it is prevented that the casing in addition to a tangential stress is also subjected to an axial stress. This is achieved by the fact that the force-free connecting points are provided between the casing and the central element. Moreover, no notch stresses which can reduce the strength act on the casing. Therefore a relatively thin-walled design for the casing is possible. Its stability is additionally enhanced by its circular cross-section, so that there is a further possibility to use for the casing conventional pipes which are mass produced in a price-favorable manner.

In addition, the central element of the inventive pulsation damper is produced in correspondence with proper requirements to force flux and manufacture, since it has large openings and no undercut. The central element can be manufactured in a diecasting process. A subsequent material-removing treatment therefore can be dispensed with, and as a result, the central element can be produced in a price-favorable manner. The connection between the bottom and the cover of the central element is performed by columns with recesses which are suitable for receiving of the mounting means, for coupling the pulsation damper for example with the housing of a displacement pump. These mounting means are accessible from outside at any time and provide a simple mounting or dismounting. Because of this arrangement, the mounting means are not loaded by the pulsating hydraulic forces from the damper chamber. The recesses in the hollow columns of the central element are completely separated from the damper chamber. Therefore a sealing of the mounting element can be dispensed with.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
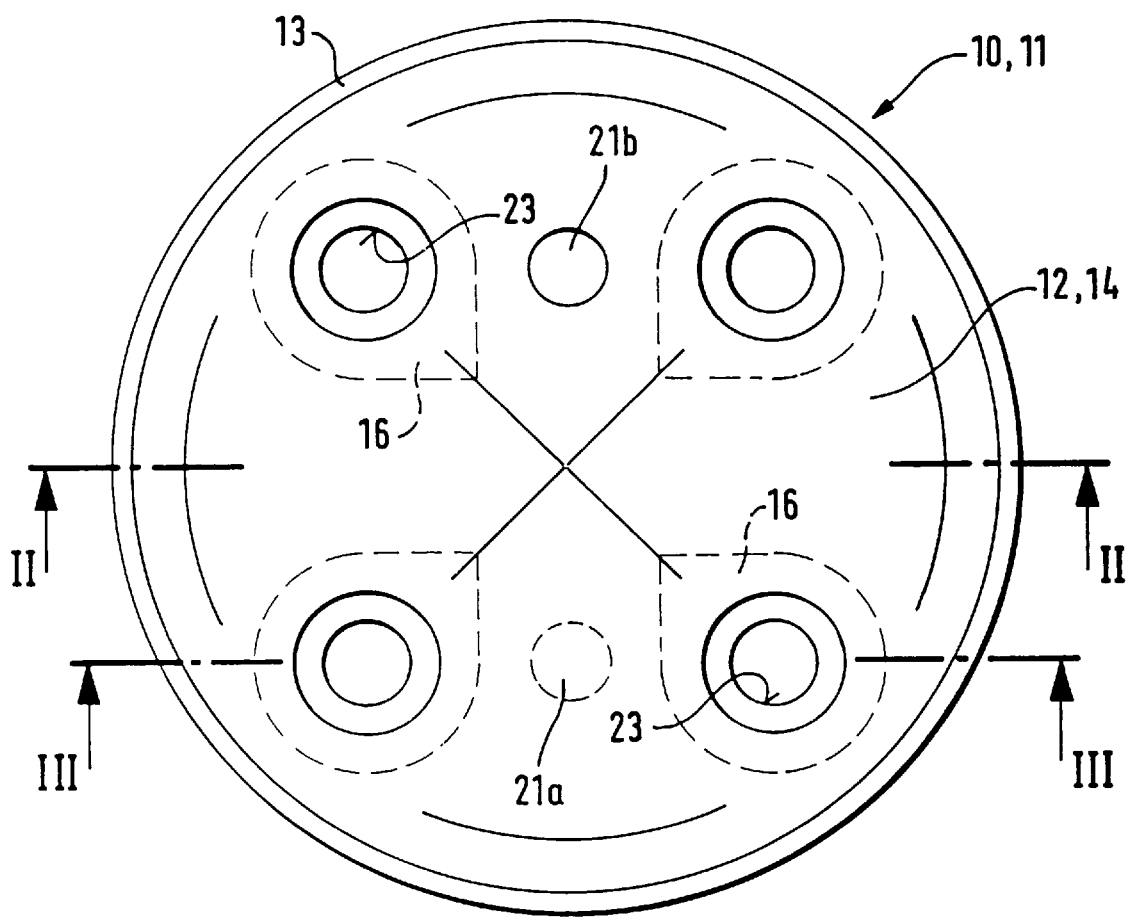
FIG. 1 is a plan view of a pulsation damper in accordance with the present invention.
Figure 2:
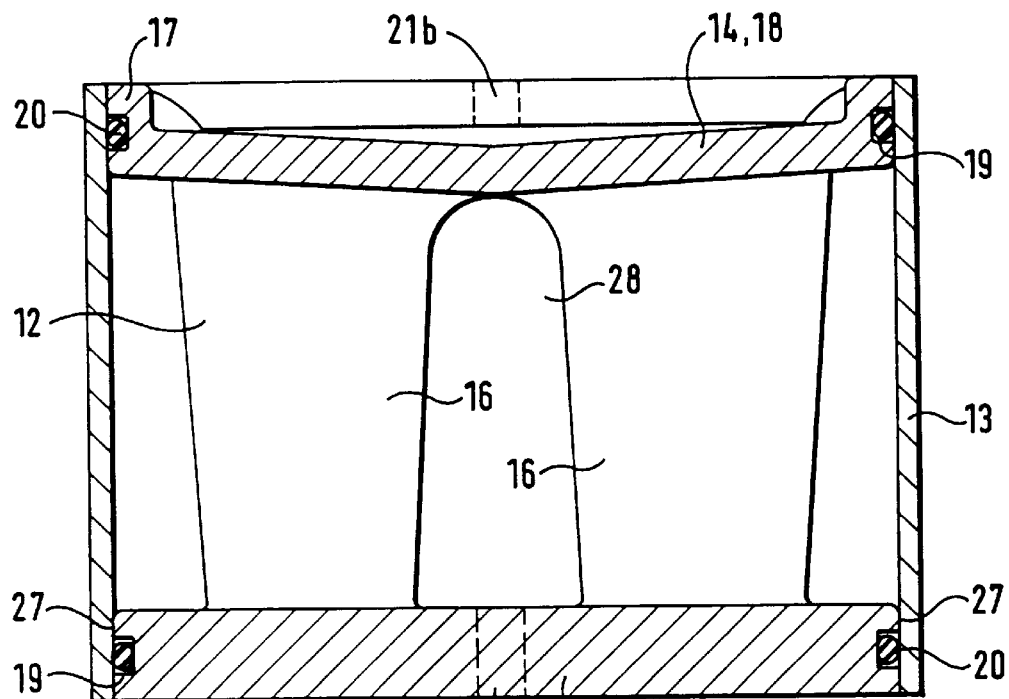
FIG. 2 is a view showing a longitudinal section through the pulsation damper, taken along the line II—II in FIG. 1.
Figure 3:
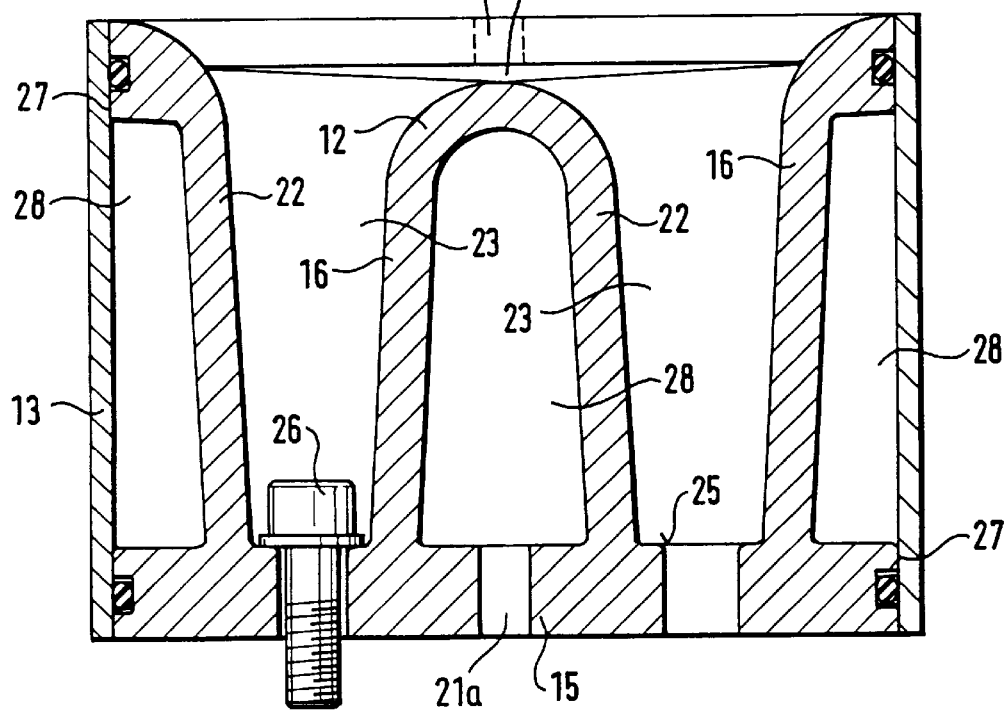
FIG. 3 is a view showing a longitudinal section of the pulsation damper taken along the line III—III in FIG. 1.

A pulsation damper 10 shown in FIGS. 1–3 has a housing 11 which is composed substantially of a central element 12 and a casing 13. In the embodiment shown in FIGS. 2 and 3, the central element 12 is composed of a disk-shape cover 14 and a disk-shaped bottom 15. Several conical hollow columns 16 are arranged on the bottom 15. The bottom 15 and the cover 14 are connected with one another by the hollow columns 16 to form a single component. The wall thickness and the wall shapes of the central element 2 are determined by its manufacture in a diecasting process.

The bottom 15 of the central element 12 has a diameter which corresponds to the outer diameter of the cover 14. Its wall thickness is greater than the wall thickness of the cover 14. The outer surface of the bottom 15 is plane.

The cover 14 has a circumferential edge 17 and a central part 18 which is set back relative to the edge 17.

The cover 14 has four arches 24. In their center an intersecting arch is provided and thereby the central part 18 is formed.

A circumferential groove 19 is formed on the outer periphery of the bottom 15 and the cover 14. The grooves 19 are provided for receiving a sealing element 20 in each groove.

For avoiding undercuts in the diecasting mold, the conical hollow columns 16 which connect the cover 14 with the bottom 15 have a cup-shaped cross-section. The columns 16 limit recesses 23 with their walls 22. The recesses 23 extend through the bottom 15 and the cover 14 to their outer surfaces. The recesses 23 are formed as throughgoing recesses extending in the longitudinal direction of the pulsation damper. In the region of the cover 14 they have throughgoing arches 24. In the region of the bottom 15 the recesses 23 are offset inwardly, so that a rectangular projection 25 operating as a screw flange is produced.

For fixing the pulsation damper 10 on a mounting surface, for example on a housing of a displacement machine, mounting elements 26, such as for example screws are utilized. The screws which are received by the recesses 23 are inserted in the recesses 23, and their shaft, with the screw head lying on the screw flange extends outwardly of the bottom 15. The plane outer surface of the bottom 15 of the central element operates in the mounted condition as an abutment for the pulsation damper 10.

The central element 12 is surrounded peripherally by a sleeve-shaped thin-walled casing 13. The casing 13 can be formed as a tube which is a mass-produced article. The inner diameter of the casing 13 is determined relative to the outer diameter of the central element 12 so that the casing 13 can be fitted on the central element 12 in the longitudinal direction. Therefore no force-locking connecting points 27 are produced between the casing 13 and the central element 12, which can cause negative action during a pressure loading of the casing 13. The connecting points 27 which are sealed from outside by the sealing elements 20 are free from forces. The axial forces between the bottom 15 and the cover 14 are taken up by the hollow columns 16.

The housing 11 of the pulsation damper 10 encloses a damper chamber 28 which is sealed from outside. The damper chamber 28 has a relatively large volume. The hollow columns 16 whose recesses 23 are separated from the damper chamber 28 by their walls 22, extend through the damper chamber. The damper chamber 28 can be connected between the pressure outlet of a displacement machine and a working connection of a hydraulic consumer. For this purpose, the supply and discharge conduits 21*a*, 21*b* are provided in the bottom 15 or in the cover 14 of the central element 12. Both the displacement machine and the hydraulic consumer are not shown in the drawings.

The volume of the damper chamber 28 amounts to a multiple of the volume which is supplied by the displacement machine per unit time. It acts as an elastic receptacle for the volume stream pulsation and as a reflection sound damper. A hydraulic consumer can be thereby supplied with a continuous feed stream whose pressure level fluctuates only a little, with relatively small flow noise in the hydraulic circuit.

Modifications and changes in the inventive vibration damper are naturally possible. In connection with this, the fixing of the pulsation damper 10 can be performed with a different number or a different arrangement of the mounting elements 26 in a corresponding number of the hollow columns 16. In the shown embodiment, four hollow columns 16 are illustrated. However, the central mounting is possible only by one or three or more mounting elements 27.

Also, a further improvement of the damping properties of the pulsation damper 10 is possible by an optimized elastic forming of the bottom 15 or the cover 14. A production of the central element 12 of a synthetic plastic material is also recommended.

It will be understood that each of the elements described above, or two or more together, may also find a useful application in other types of constructions differing from the types described above.

While the invention has been illustrated and described as embodied in pulsation damper, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pulsation damper for hydraulic circuits, comprising a housing including a bottom, a casing, and a cover; a damper chamber which is sealed from outside and provided with supply and discharge means for a pressure medium, said housing being composed of two parts so that said bottom and said cover are connected with one another to form a single central element, while said casing peripherally surrounds said central element and means forming force-free connecting points between said central element and said cover.

2. A pulsation damper as defined in claim 1, wherein said central element has at least one throughgoing opening which extends parallel to a central axis of said central element and is separated from said damper chamber by a wall.

3. A pulsation damper as defined in claim 2, wherein said wall has a side which faces said opening and is offset at said side.

4. A pulsation damper as defined in claim 1, wherein said central element is formed as a diecast part.

5. A pulsation damper as defined in claim 1, wherein said casing is tubular.

6. A pulsation damper as defined in claim 1; and further comprising sealing means including at least one sealing element provided on said connecting points between said central element and said casing.

* * * * *